US011751062B1

(12) United States Patent
de Haas

(10) Patent No.: US 11,751,062 B1
(45) Date of Patent: Sep. 5, 2023

(54) SECURITY APPARATUS AND METHODS FOR WIRELESS DATA EXCHANGE

(71) Applicant: Dialog Semiconductor B.V., s-Hertogenbosch (NL)

(72) Inventor: Joek de Haas, Veldhoven (NL)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 0 days.

(21) Appl. No.: 16/656,717

(22) Filed: Oct. 18, 2019

(51) Int. Cl.
| | | |
|---|---|---|
| H04W 12/63 | (2021.01) |
| H04W 12/50 | (2021.01) |
| H04W 64/00 | (2009.01) |
| H04W 74/08 | (2009.01) |
| H04L 9/40 | (2022.01) |
| H04W 12/069 | (2021.01) |

(52) U.S. Cl.
CPC ......... *H04W 12/63* (2021.01); *H04L 63/0869* (2013.01); *H04W 12/069* (2021.01); *H04W 12/50* (2021.01); *H04W 64/003* (2013.01); *H04W 74/0833* (2013.01)

(58) Field of Classification Search
CPC ....... H04W 12/00503; H04W 12/0609; H04W 12/003; H04W 64/003; H04W 74/0833; H04W 12/63; H04L 63/0869; G07C 9/00111; G07C 9/00309; G07C 2009/00793; G07C 2009/0042; H04B 17/318

See application file for complete search history.

(56) References Cited

U.S. PATENT DOCUMENTS

| | | | |
|---|---|---|---|
| 11,258,594 B2* | 2/2022 | Qi ........................ H04L 9/0852 |
| 11,470,472 B2* | 10/2022 | Chazot .................. H04L 9/3215 |
| 11,516,337 B2* | 11/2022 | Ledvina .................. H04L 51/58 |
| 2013/0315393 A1* | 11/2013 | Wang .................... H04W 12/06 |
| | | | 380/270 |
| 2016/0292940 A1* | 10/2016 | Tschache ........... G07C 9/00309 |
| 2019/0044951 A1* | 2/2019 | Zivkovic ............... H04L 67/535 |
| 2019/0132804 A1* | 5/2019 | Hong .................... H04W 52/46 |
| 2019/0308615 A1* | 10/2019 | Lavoie .................... H04W 4/44 |
| 2020/0029213 A1* | 1/2020 | Nölscher ................ B60R 25/24 |
| 2020/0037345 A1* | 1/2020 | Ryoo ................. H04W 72/1268 |
| 2020/0120500 A1* | 4/2020 | Sharma ................ H04W 12/02 |
| 2020/0307555 A1* | 10/2020 | Van Wiemeersch ........................ |
| | | | G05D 1/0022 |
| 2020/0336897 A1* | 10/2020 | Ledvina ........... H04W 12/0471 |
| 2020/0358755 A1* | 11/2020 | Abdul ................. H04W 12/084 |
| 2020/0363524 A1* | 11/2020 | Yoon ................... H04L 63/0442 |

(Continued)

OTHER PUBLICATIONS

"Diffie-Hellman key exchange", webpage accessed May 24, 2023, pp. 1-12. https://en.wikipedia.org/w/index.php?title=Diffie--Hellman_key_exchange&oldid=1156276416.

*Primary Examiner* — Khawar Iqbal
(74) *Attorney, Agent, or Firm* — Saile Ackerman LLC; Stephen B. Ackerman

(57) ABSTRACT

A method of authenticating a first device at a second device for two wirelessly communicating devices, the method comprising: determining the distance between the two devices based on a property of a received communication; at each device, determining at least one shared physical layer property of the communication channel between the two devices; and authenticating the first device based on the determined distance between the two devices and the determined physical layer property of the communication channel.

19 Claims, 3 Drawing Sheets

(56) References Cited

U.S. PATENT DOCUMENTS

| | | | | |
|---|---|---|---|---|
| 2020/0382954 | A1* | 12/2020 | Chazot | H04L 9/14 |
| 2021/0281973 | A1* | 9/2021 | Mozayeni | H04W 4/80 |
| 2022/0038906 | A1* | 2/2022 | Dreasher | B61L 27/40 |
| 2022/0225267 | A1* | 7/2022 | Hauck | H04W 12/0471 |
| 2022/0300595 | A1* | 9/2022 | Hansen | H04W 12/069 |
| 2023/0007484 | A1* | 1/2023 | Everson | G07C 9/00309 |

* cited by examiner

SECURITY APPARATUS AND METHODS FOR WIRELESS DATA EXCHANGE

TECHNICAL FIELD

The present disclosure relates to security improvements in a wireless data exchange, and in particular to the authentication of devices. The present disclosure also relates to proximity or location detection in a wireless data exchange protocol.

BACKGROUND

Internet of Things (IoT) devices typically have limited storage memory and limited capabilities in terms of computing and communications. As a result, complicated cryptographic protocols and sophisticated encryption/decryption algorithms are generally unsuitable. In particular, it is difficult to manage and distribute the secret keys required for public-key cryptography. This is especially relevant to 5G networks as they are usually decentralized, and devices may randomly connect in or leave the network at any time.

Recently, there has been an increased interest in physical layer security (also known as PHYSEC). PHYSEC schemes often do not rely on traditional encryption techniques, thus overcoming the difficulty in the distribution and management of secret keys. They often only need to complete the relatively simple signal processing algorithms, which requires less computational capacity.

One form of PHYSEC is PHYSEC encryption, in which PHYSEC techniques are used to generate the distribution of cryptography keys. Secrecy is achieved by exploiting the shared physical layer properties of the environment of two communicating devices, such as multipath, fading, shadowing noise or interference. For two devices which are communicating with each other, the physical layer properties will be very similar and each device can independently use these properties to generate the same private key.

The procedure for physical layer key generation mainly includes four steps: (1) channel probing; (2) parameter quantization; (3) Information reconciliation; and (4) Privacy amplification. Physical layer encryption combines the secret key generation at the physical layer and the encryption at the application layer. This can be easily incorporated with existing network security protocols, which are based on cryptographic techniques at the application layer.

Various wireless ranging techniques are also known. One example of this is Time Of Flight (TOF) in which the transit time of a communication is used to determine the distance between the transmitting and receiving devices. In accordance with the Bluetooth Low Energy (BLE) standard, many BLE devices support a proximity feature which measures the distance between the devices. The proximity feature defined by the BLE specification uses Received Signal Strength Indication (RSSI) to calculate the distance.

Distance bounding protocols are also known. These protocols enable a device to establish an upper bound on the physical distance to a second communicating device. One application of this is keyless car entry systems. To open and start the car, the car verifies that the key, is within a particular range of the car. However, keyless car entry systems are particularly vulnerable to a relay attack and/or eavesdropping. There has been a large increase in the number of cars being stolen in the last five years and much of this increase is due to the hacking of keyless car entry systems.

In a relay attack, the attacker places one device in the proximity of the physical key, and the other device in the proximity of the car. The attacker then relays messages between the key and the car, enabling the car to be opened and started even if the key is physically far from the car.

SUMMARY

According to a first aspect of the disclosure there is provided a method of authenticating a first device at a second device for two wirelessly communicating devices, the method comprising:
   determining the distance between the two devices based on a property of a received communication;
   at each device, determining at least one shared physical layer property of the communication channel between the two devices; and
   authenticating the first device based on the determined distance between the two devices and the determined physical layer property of the communication channel.

Optionally, the physical layer property of the communication channel is random. Optionally, the physical layer property of the communication channel is artificially made random.

Optionally, the physical layer property of the communication channel comprises noise.

Optionally, the physical layer property of the communication channel comprises artificial noise.

Alternatively or in addition, the physical layer property of the communication channel comprises interference.

Optionally, the distance between the two devices is determined based on a time of flight of the received communication. Alternatively, the distance between the two devices may be determined based on a received signal strength indication of the received communication.

Optionally, the method includes denying authentication of the first device at the second device in the event that the determined physical layer properties of the communication channel do not correlate above a predetermined threshold.

Optionally, the method includes generating a key based on the at least one physical layer property of the communication channel. Optionally, at least one key is a private key.

Optionally, the method includes denying authentication of the first device at the second device in the event that the key generated at the first device does not correspond to the key generated at the second device.

Optionally, the method includes denying authentication of the first device at the second device in the event that the determined distance between the two devices is greater than a predetermined threshold.

Optionally, the method includes, at the first device, determining the distance between the two devices based on the property of the received communication.

Optionally, the method includes authenticating the second device at the first device.

Optionally, the method includes denying authentication of the second device at the first device in the event that the key generated at the second device does not correspond to the key generated at the first device.

Optionally, the method includes denying authentication of the second device at the first device in the event that the determined distance between the two devices is greater than a predetermined threshold.

According to a second aspect of the disclosure there is provided an authentication system for two wirelessly communicating devices, the system comprising:
   a first and a second device, each device comprising:
      a transceiver for transmitting and receiving wireless communications; and a processor adapted to determine at least one shared physical layer property of the communication channel between the two devices, wherein the processor of at least the second device is further adapted to determine the distance between the two devices based on a property of a received communication, and wherein the second device is adapted to authenticate the first device based on the determined distance between the two devices and the determined physical layer property of the communication channel.

Optionally, the physical layer property of the communication channel is random.

Optionally, the physical layer property of the communication channel comprises noise. Alternatively or in addition, the physical layer property of the communication channel comprises interference.

Optionally, the processor of at least the second device is adapted to determine the distance between the two devices based on a time of flight of the received communication.

Optionally, the second device is adapted to deny authentication of the first device second device in the event that the determined physical layer properties of the communication channel do not correlate above a predetermined threshold.

Optionally, the processor is adapted to generate a key based on the at least one physical layer property of the communication channel. Optionally, at least one key is a private key.

Optionally, the second device is adapted to deny authentication of the first device second device in the event that the key generated at the first device does not correspond to the key generated at the second device.

Optionally, the first device is adapted to deny authentication of the second device in the event that the determined distance between the two devices is greater than a predetermined threshold.

Optionally, the processor of the first device is adapted to determine the distance between the two devices based on the property of the received communication.

Optionally, the system includes authenticating the second device at the first device.

Optionally, the first device is adapted to deny authentication of the second device in the event that the key generated at the second device does not correspond to the key generated at the first device.

Optionally, the first device is adapted to deny authentication of the second device in the event that the determined distance between the two devices is greater than a predetermined threshold.

BRIEF DESCRIPTION OF THE DRAWINGS

The disclosure will be described below, by way of example only, with reference to the accompanying drawings, in which.

DESCRIPTION

Figure 1:
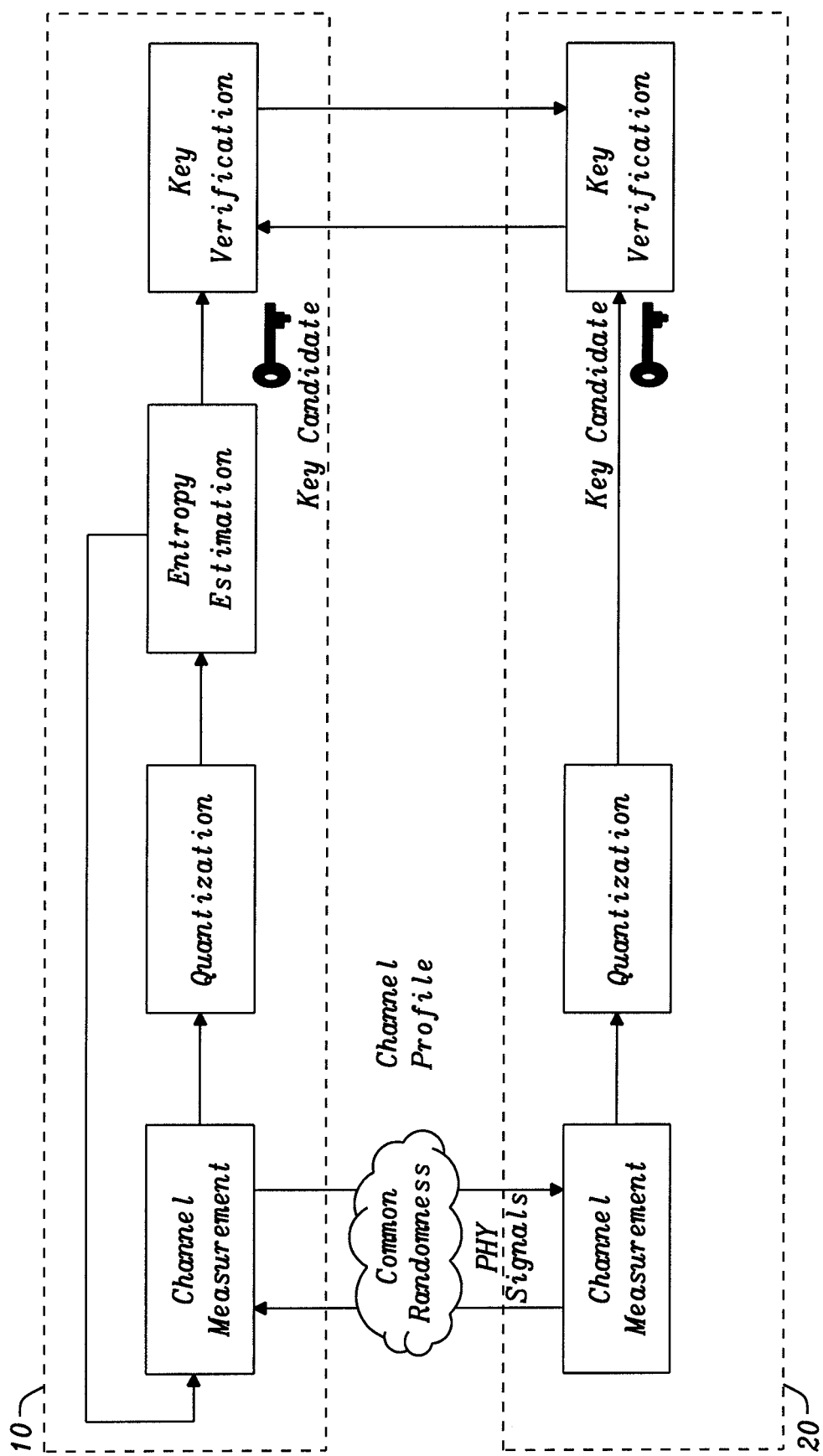
FIG. 1 shows a schematic diagram of an authentication method in accordance with the present disclosure.

FIG. 1 shows an authentication method for two wirelessly communicating devices.

Figure 2:
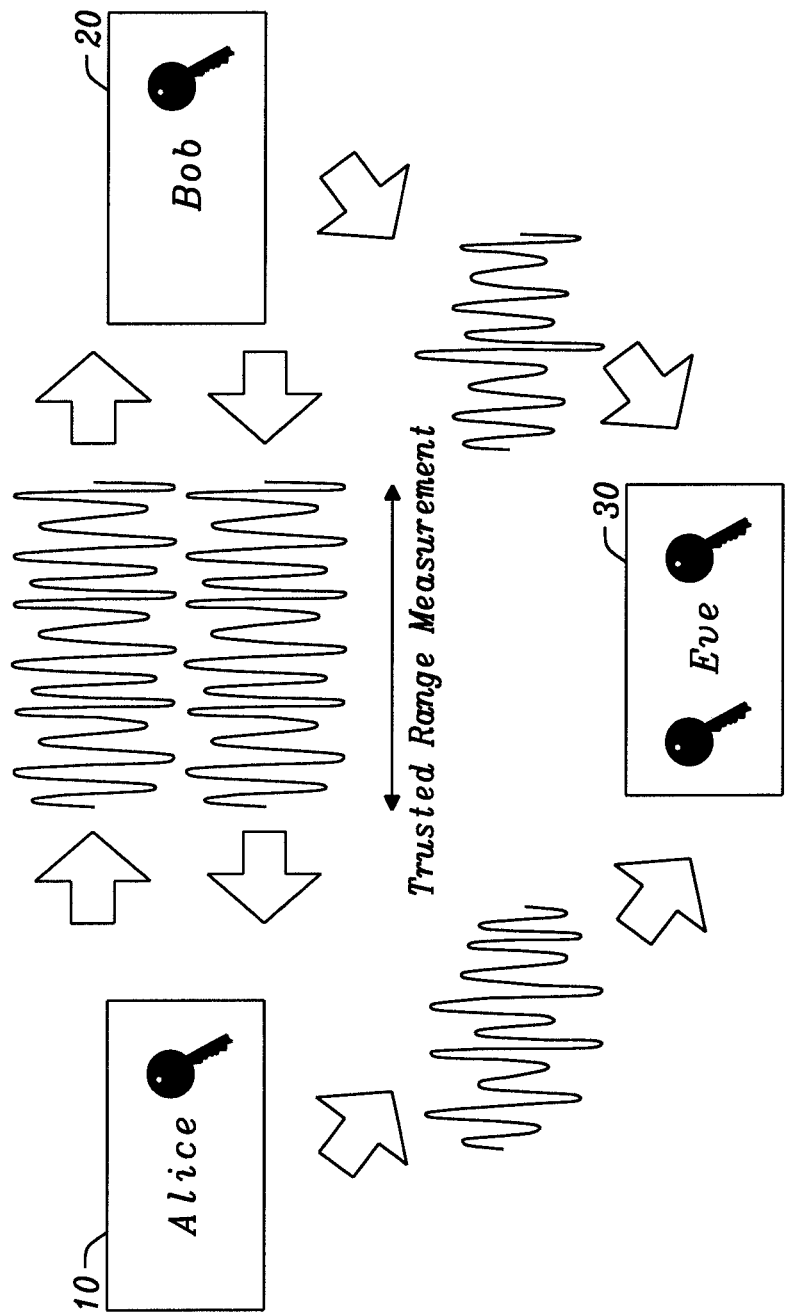
FIG. 2 shows a schematic diagram of an authentication system and a nearby eavesdropping device.
Figure 3:
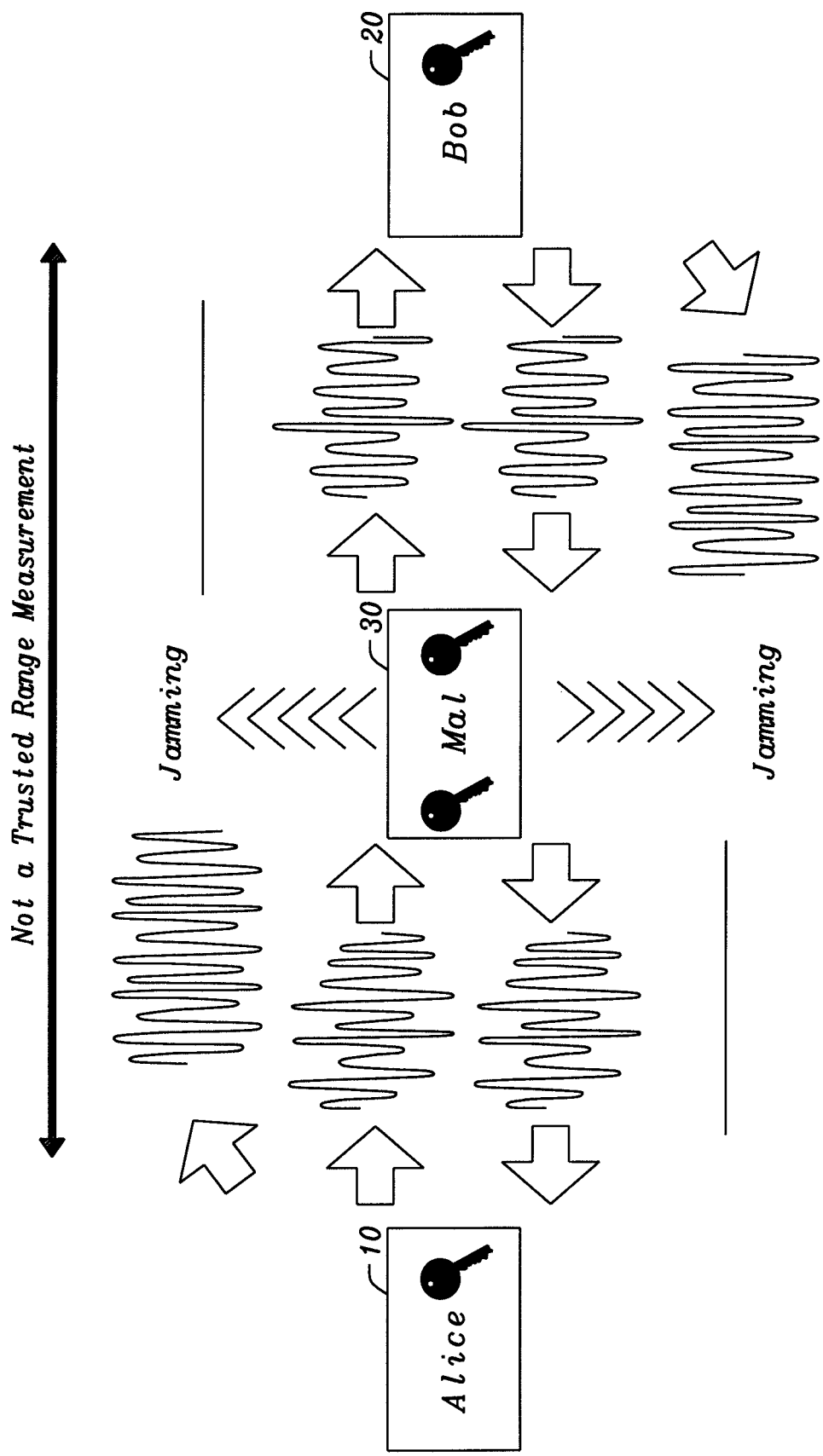
FIG. 3 shows a schematic diagram of an authentication system and a device attempting a relay attack.

A first electronic device 10 and a second electronic device 20 are in close proximity to each other. For example, they may be within 10 metres of each other. Each device includes a processor and a transceiver. In this embodiment, the first device 10 is a key fob which can be carried by a user, and the second device 20 is the entry system of a car. In FIGS. 2 and 3, they are also referred to as Alice and Bob respectively.

As the two devices are close to each other, they will share a similar environment. When the two devices communicate with each other on a communication channel, the communication path from the first device 10 to the second device 20 will be similar to that of the second device 20 to the first device 10. Therefore, the physical environment will be similar in terms such as noise, interference, reflections, fading, shadowing, multipaths and the like. This physical environment is random in nature and so cannot be mathematically predicted.

Any communications sent at this point can be specified such that they do not reveal the identity or any other features of either device.

Each of the two devices is adapted to measure the physical environment and to generate a private key based on this. Each device may carry out channel probing; parameter quantization; information reconciliation; and privacy amplification. Since the physical environment for both devices is very similar, the keys generated will be identical to within an acceptable threshold. Therefore, the devices do not need to store a list of private keys in memory. Also, it is not necessary to distribute keys to the devices from an authority.

In addition, each device measures the distance between the two devices. This is done based on the time of flight (TOF) of a received communication from the other device. The distance is measured simultaneously with the channel measurement.

Each device then performs an authentication process for the other device. Firstly, it is determined whether the measured distance is within a predetermined threshold. If not, authentication is denied. Secondly, it is verified that the key generated by each device is the same. For example, the first device 10 could send a communication to the second device 20 which has been encrypted using the key generated by the first device 10. Only if the communication can be decrypted using the key generated by the second device 20 will the second device 20 authenticate the first device 10. It should be noted that, up to this point, neither device has provided any data which could be used to identify the device.

For the embodiment of a keyless entry system, it can be sufficient that only the second device 20, the system within the vehicle, authenticates the first device 10, the key fob. However, for additional security, the first device 10 can authenticate the second device 20. This can be done in the same way in that the first device 10 also determines the distance between the two devices based on the TOF of a received communication. The second device 20 is only authenticated at the first device 10 if the measured distance is within the predetermined threshold.

The method according to the disclosure provides robust security against both relay attacks and eavesdropping, as will now be described with reference to FIGS. 2 and 3.

FIG. 2 shows the two devices in proximity, and so in the same physical environment, but with a third device 30 also close by. This third device 30 is attempting to maliciously eavesdrop on communications between the first and second devices. In FIG. 2 it is called Eve.

Alice 10 and Bob 20 initially send innocuous communications to each other, such as advertising channel or other broadcast messages. These are also picked up by Eve 30. Using these communications, Alice 10 and Bob 20 both determine the distance between each other. This confirms that they are within a suitable distance of each other. If they were not, neither device would authenticate the other.

Alice 10 and Bob 20 then each generate a key from the shared physical environment. The keys they generate are identical. It is known that the physical environment is no longer correlated at a distance greater than half a wavelength. For a 2.4 Ghz ISM band, this corresponds to a distance of 6 cm. Therefore, if Eve 30 is any further away than this then the physical environment will be significantly different. Even if Eve 30 knows the algorithm for generating the key from the physical environment, the key generated will not match those generated by Alice 10 and Bob 20. Therefore, Eve 30 is unable to receive authentication.

FIG. 3 shows an attempted relay attack. Alice 10 and Bob 20 are some distance apart. A third device 30 (called Mal in FIG. 3) is in the proximity of Alice 10 and Bob 20 and is attempting to pretend to be Bob 20 (to Alice 10) and Alice 10 (to Bob 20) in order to obtain unauthorised entry to the vehicle. Alice 10 and Bob 20 are out of range of each other. Or it could be that they are in range of each other but that Mal 30 is also jamming communication between Alice 10 and Bob 20.

Firstly, Mal 30 communicates with Alice 10. Assuming that they are close enough to each other, Alice 10 will determine that Mal 30 in within an appropriate distance. Each device will then generate identical keys based on their shared physical environment.

Mal 30 can then communicate with Bob 20. Again, assuming that they are close enough to each other, Bob 20 will determine that Mal 30 in within an appropriate distance. Also. each device will generate identical keys based on their shared physical environment. However, the keys generated by Alice 10 and Mal 30 will not match the keys generated by Bob 20 and Mal 30.

The present disclosure offers a number of advantages. For example, the key generation and authentication process requires less computational capacity and storage than existing schemes. This is particularly advantageous for 5G devices. Also, there is no requirement to distribute private keys.

The method and system of the present disclosure provides a robust defence against both relay attacks and eavesdropping. The use of distance measuring is simultaneous and inseparable with the use of key generation based on the physical environment. This is similar to using two factor authentication in that both conditions need to be simultaneously (or inseparably) satisfied.

Various modifications and improvements can be made to the above without departing from the scope of the disclosure.

What is claimed is:

1. A method of authenticating a first device at a second device for two wirelessly communicating devices, the method comprising:
    determining the distance between the two devices based on a property of a received communication;
    at each device, and at each time of authenticating, determining at least one shared property of the physical environment of the communication channel between the two devices and generating a new private key based on the determined shared physical environment property, wherein the shared property of the physical environment is different than the distance between the two devices; and
    authenticating the first device based on the determined distance between the two devices and using the generated private key, wherein the physical environment property of the communication channel is random, wherein:
    the method includes denying authentication of the first device at the second device in the event that the determined physical environment properties of the communication channel do not correlate above a predetermined threshold; and
    the method includes denying authentication of the second device at the first device in the event that the determined physical environment properties of the communication channel do not correlate above a predetermined threshold.

2. The method as claimed in claim 1, wherein the physical environment property of the communication channel is artificially made random.

3. The method as claimed in claim 1, wherein the physical environment property of the communication channel comprises noise.

4. The method as claimed in claim 3, wherein the physical environment property of the communication channel comprises artificial noise.

5. The method as claimed in claim 1, wherein the physical environment property of the communication channel comprises interference.

6. The method as claimed in claim 1, wherein the physical environment property of the communication channel comprises artificial interference.

7. The method as claimed in claim 1, wherein the distance between the two devices is determined based on a time of flight of the received communication.

8. The method as claimed in claim 1, wherein the method includes denying authentication of the first device at the second device in the event that the determined distance between the two devices is greater than a predetermined threshold.

9. The method as claimed in claim 1, wherein the method includes, at the first device, determining the distance between the two devices based on the property of the received communication.

10. The method as claimed in claim 1, wherein the method includes authenticating the second device at the first device.

11. The method as claimed in claim 1, wherein the method includes denying authentication of the second device at the first device in the event that the determined distance between the two devices is greater than a predetermined threshold.

12. An authentication system for two wirelessly communicating devices, the system comprising:
    a first and a second device, each device comprising:
    a transceiver for transmitting and receiving wireless communications; and
    a processor adapted to determine at least one shared property of the physical environment of the communication channel between the two devices and, at each time of authenticating, generate a new private key based on the determined shared physical environment property, wherein the shared property of the physical environment is different than the distance between the two devices,
    wherein the processor of at least the second device is further adapted to determine the distance between the two devices based on a property of a received communication, and
    wherein the second device is adapted to authenticate the first device based on the determined distance between the two devices and using the generated private key, wherein the physical environment property of the communication channel is random;

the second device is adapted to deny authentication of the first device in the event that the determined physical environment properties of the communication channel do not correlate above a predetermined threshold; and the first device is adapted to deny authentication of the second device in the event that the determined physical environment properties of the communication channel do not correlate above a predetermined threshold.

13. The system as claimed in claim 12, wherein the physical environment property of the communication channel comprises noise.

14. The system as claimed in claim 12, wherein the physical environment property of the communication channel comprises interference.

15. The system as claimed in claim 12, wherein the processor of at least the second device is adapted to determine the distance between the two devices based on a time of flight of the received communication.

16. The system as claimed in claim 12, wherein the first device is adapted to deny authentication of the second device in the event that the determined distance between the two devices is greater than a predetermined threshold.

17. The system as claimed in claim 12, wherein the processor of the first device is adapted to determine the distance between the two devices based on the property of the received communication.

18. The system as claimed in claim 17, wherein the system includes authenticating the second device at the first device.

19. The system as claimed in claim 18, wherein the first device is adapted to deny authentication of the second device in the event that the determined distance between the two devices is greater than a predetermined threshold.

\* \* \* \* \*